United States Patent [19]

Dukart et al.

[11] Patent Number: 4,931,332
[45] Date of Patent: Jun. 5, 1990

[54] NON-WARPING AND TORQUE RESISTANT STRUCTURAL PANEL FOR PANELING, FURNITURE AND FLOORING

[76] Inventors: Richard L. Dukart; Blaine R. Dukart, both of Box 266, Dickinson, N. Dak. 58601

[21] Appl. No.: 317,505

[22] Filed: Mar. 1, 1989

[51] Int. Cl.$^5$ .............................................. B32B 3/10
[52] U.S. Cl. .......................................... 428/50; 428/44
[58] Field of Search ............................ 428/47, 48, 50

[56] References Cited

U.S. PATENT DOCUMENTS

| D. 241,335 | 9/1976 | Bogan | D25/85 |
| D. 241,336 | 9/1976 | Bogan | D25/85 |
| D. 241,338 | 9/1976 | Bogan | D25/85 |
| 1,520,313 | 12/1924 | Skinner et al. | 428/50 |

OTHER PUBLICATIONS

"Sweets" Catalog File, vol. 5, Sec. 8.3, p. 3, 1/1978.

Primary Examiner—Alexander S. Thomas
Attorney, Agent, or Firm—Shlesinger & Myers

[57] ABSTRACT

A non-warping and torque resistant structural panel including a top panel composed of four different size squares mounted on a base sheet. The squares when forming a pattern, have apices which are intermediate to and relatively offset from the apices of adjacent squares thereby forming relatively short vertically and horizontally extending intersecting lines, which resist warping and lateral torque.

17 Claims, 2 Drawing Sheets

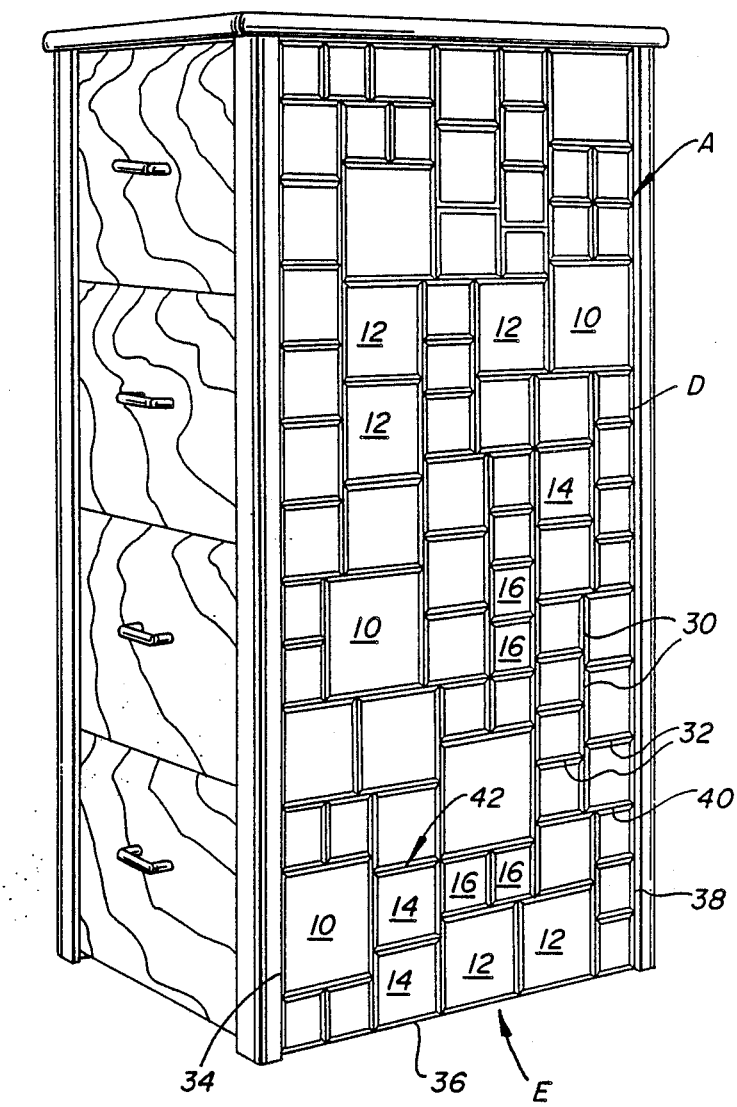
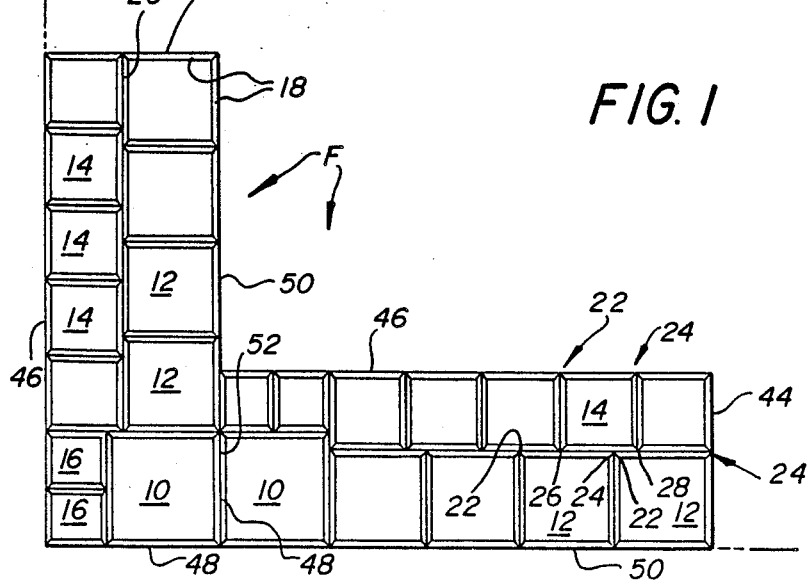
FIG. 1
FIG. 4

NON-WARPING AND TORQUE RESISTANT STRUCTURAL PANEL FOR PANELING, FURNITURE AND FLOORING

HISTORICAL BACKGROUND AND FIELD OF THE INVENTION

The present invention is generally directed to a structural panel, and more particularly to a non-warping and torque resistant structural panel for use in paneling, furniture, and flooring.

The use of wooden panels or the like to cover floors, furniture, and walls and the like is known in the art. The paneling is generally used to provide ornamentation to the underlying structure and to provide structural reinforcement. Typically, the paneling is available in the form of continuous sheets with decorative pattern thereon, which may be cut to size and affixed to a piece of furniture, a wall, or a floor. The paneling is also available in the form of square or rectangular pieces which are affixed to, for example, a floor or a wall, in a desired manner to form a pattern. Conventionally, the pieces are glued on to underlying article one by one. Most commonly, the paneling, whether in the form of a continuous sheet or in the form of a number of squares or rectangles, is made of wood which inherently has the tendency to imbibe moisture existing in the atmosphere. This necessarily leads to warping of the paneling causing it to swell and become detached from the underlying article. It should also be noted that the warping may also be caused by the poor craftsmanship and the type of glue which has been used in the first place. Nevertheless, the problem of warping is real and no practical solution has thus been offered.

Some examples of various types of panels are disclosed in U.S. Pat. Nos. De. 241,335; 241,336; and 241,338 and "Sweet's" Catalog File, Volume 5, Section 8.3, page 3 (1978). These references show various panels with inter-arranged block design.

However, there is a need in the art for a structural panel which is non-warping and torque resistant.

OBJECTS AND SUMMARY OF THE INVENTION

The principal object of the present invention is to provide a non-warping and torque resistant structural panel for use in paneling, furniture, and flooring.

Another object of the present invention is to provide a non-warping and torque resistant structural panel which includes a number of different size squares which may be used to form an overall pattern.

It is yet another object of the present to provide a non-warping and torque resistant structural panel which provides strength to the article on which it is affixed.

Still another object of the present invention is to provide a non-warping and torque resistant structural panel which prevents bending or twisting thereby maintaining rigidity of the article on which it is affixed.

An additional object of the present is to provide a non-warping and torque resistant structural panel which tends to resist deformity in the overall paneling design due to the fact that it includes a series of short lines extending in vertical and horizontal directions instead of relatively long and continuous lines.

Still an additional object of the present invention is to provide a non-warping and torque resistant structural panel which is particularly useful when affixed or secured to a plywood material.

A further object of the present invention is to provide a non-warping and torque resistant structural panel which prevents chipping and markings, and splitting of the paneling due to stress at the interface of various blocks.

Still a further object of the present invention is to provide a non-warping and torque resistant structural panel which is durable, easy to manufacture and use.

In summary, the main object of the present invention is to provide a structural panel for paneling, furniture and flooring which does not warp, resists torque, and prevents bending, twisting, chipping or markings.

BRIEF DESCRIPTION OF THE DRAWINGS

The above and other objects and advantages and novel features of the present invention will become apparent from the following detailed description of the preferred embodiment of the invention illustrated in accompanying drawings, in which:

FIG. 1 is a perspective view of an article of furniture having mounted on a side wall thereof a structural panel of the present invention;

FIG. 4 shows two minimum size patterns made by using at least one square of all sizes of the panel of the invention.

DETAILED DESCRIPTION OF THE INVENTION

The structural panel of the invention has been indicated in FIG. 1 by A. The panel A includes a base sheet B for securing thereon by glue or the like conventional means a top sheet C. The top sheet C is composed of a number of different size squares 10, 12, 14 and 16 which form an overall pattern D. Preferably, the largest square 10 has a length of about 6 inches and smallest square 16 has a length of about 3 inches. The medium size squares 12 and 14 have lengths of about 5 and 4 inches, respectively.

Figure 2:
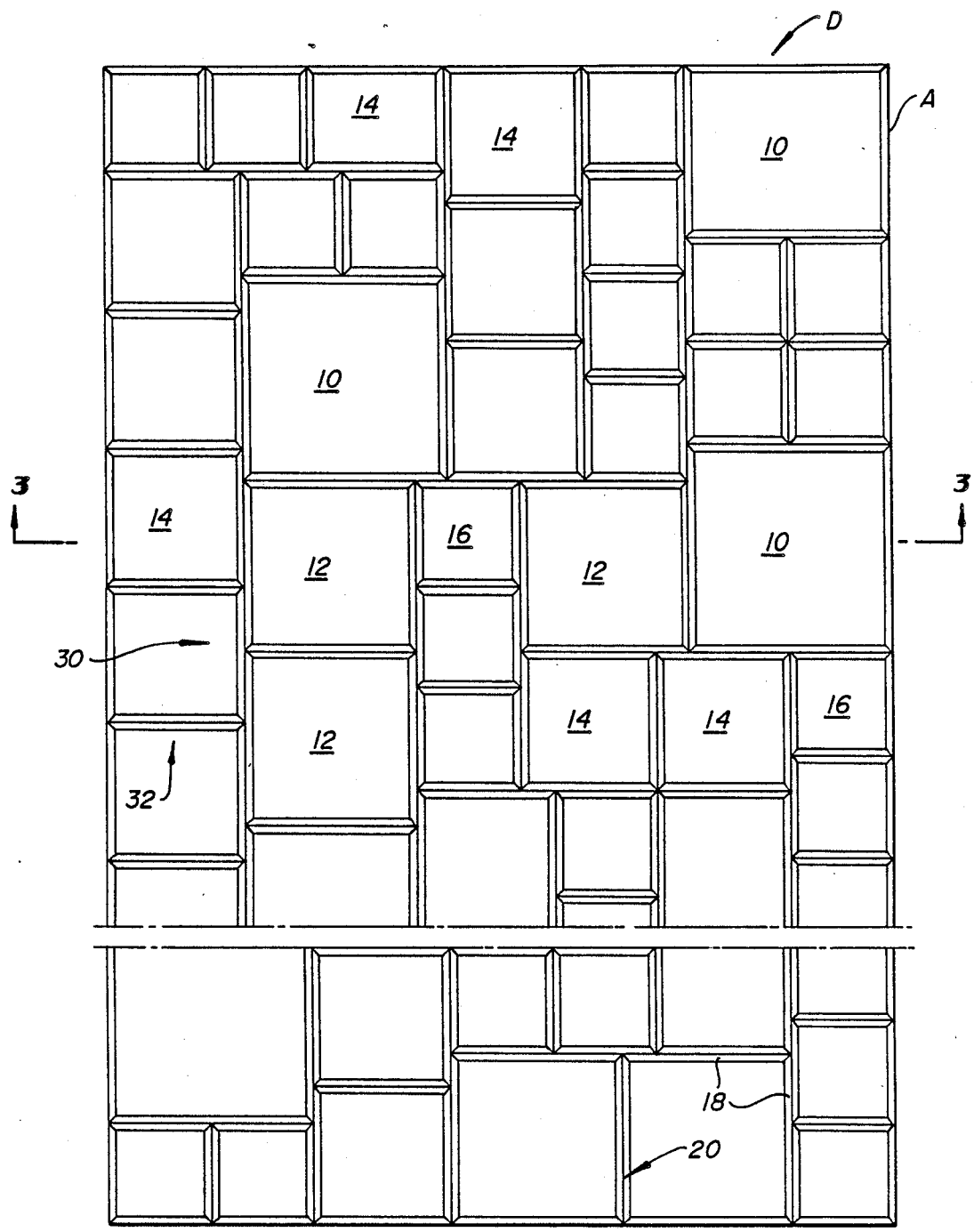
FIG. 2 is an enlarged partial view of the panel shown in FIG. 1.
Figure 3:
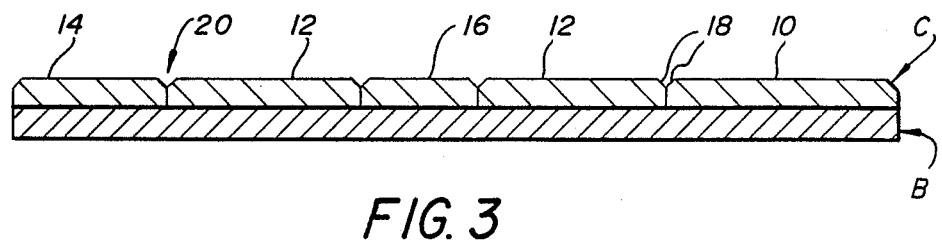
FIG. 3 is a section taken along line 3—3 of FIG. 2.

The squares 10, 12, 14 and 16, each has bevelled edges 18 which form generally V-shaped grooves 20 between adjacently spaced squares, shown in FIG. 3. Each square 10, 12, 14 and 16 has apices 22, 24, 26 and 28 which are arranged with respect to each other in a manner that at least one apex of one square is intermediate and offset from the apices of its adjacent square to thereby produce a panel which is warp and torque resistant due to the offsetting of the apices. For example, as shown in FIG. 4, apex 26 of square 14 is intermediate apices 22 and 24 or adjacently positioned square 12. Similarly, apex 28 of same square 14 is intermediate apices 22 and 24 of another square 12. This arrangement produces a pattern in which various apices are intermediate to offset from the apices of adjacently positioned squares. The offsetting of the apices 22, 24, 26 and 28 of squares 10, 12, 14 and 16 produces relatively short vertically and horizontally extending intersecting lines 30 and 32 which resistant varp and torque due to their intersecting nature, shown in FIG. 1. It would be apparent to those of ordinary skill in the art that if long and continuous lines spanning across the width and the length of a pattern of the type disclosed herein, are formed, the panel will have a greater tendency to warp along the long lines, and will be vulnerable to torque forces due to lateral placement of squares. This would produce a panel with a greater tendency to warp and become less durable.

The squares 10, 12, 14 and 16 when positioned in relation to each other form at least a portion of an overall pattern D, one random pattern E of which includes at least one of square 10, and at least two of squares 12, 14 and 16, shown in FIG. 1. The three adjacent sides of pattern E form straight edges 34, 36 and 38. The top edge 40 of this pattern E includes a step 42. If this pattern were formed, for example, such that top edge 40 was the top edge of an overall pattern D, top edge 40 would be clipped to form a straight edge.

As shown in FIG. 4, when one of square 10, two of square 16, four of square 12, and five of square 14, are used, a rectangular pattern F with four straight edges 44, 46, 48 and 50, is formed having dimension of about nine by twenty-six inches. FIG. 4 shows two of such rectangular patterns F, one lying vertically and one lying horizontally.

In a given pattern, the squares 10, 12, 14 and 16 are arranged such that only one edge of one largest square 10 may only be adjacent one edge of another largest square 10, shown in FIG. 4, thereby having a common edge 52. In other words, a maximum of two squares 10 may be arranged side by side, and, for example, three or more squares 10 may not be arranged adjacent each other. Similarly, the next largest square 12 may be arranged so that only three edges thereof may lie adjacent three other squares 12 of same size. Likewise, squares 14 and 16 may be arranged to have four other squares 14 and 16, respectively, lying adjacent four sides thereof.

As can be seen from the above, four different size square 10, 12, 14 and 16, may be arranged to form various patterns to produce a warp and torque resistant panel. The panel may be used for paneling, flooring and furniture.

While this invention has been described as having a preferred design, it is understood that it is capable of further modifications, and uses and/or adaptations of the invention and following in general the principle of the invention and including such departures from the present disclosure as have come within the known or customary practice in the art to which the invention pertains, and as may be applied to the central features hereinbefore set forth, and fall within the scope of the invention or limits of the claims appended hereto.

What is claimed is:
1. A non-warping structural panel, comprising:
(a) a first laminate and a second laminate for supporting said first laminate;
(b) said first laminate secured to said second laminate;
(c) said first laminate including a plurality of first, second, third, and fourth squares arranged in a side by side relation to one another and forming an overall pattern;
(d) said plurality of squares in said first laminate including at least one of said first square, one of said second square, one of said third square and one of said fourth square;
(e) said first square being of a dimension different from said second, third and fourth squares;
(f) said second square being of a dimension different from said first, third and fourth squares;
(g) said third square being of a dimension different from said first, second and fourth squares;
(h) said fourth square being of a dimension different from said first, second and third squares;
(i) said first square being the largest square;
(j) said second square being smaller than the first square;
(k) said third square being smaller than the second square;
(l) said fourth square being smaller than the third square;
(m) said first, second, third, and fourth squares when positioned in relation to each other forming in at least a portion of said overall pattern at least one random pattern there being in said overall pattern at least one of said first squares, and at least two of said second, third and fourth squares each;
(n) said random pattern having four sides;
(o) said squares on at least two adjacent sides of said random pattern being positioned so as to form in said two adjacent sides straight edges;
(p) said squares having bevelled edges; and
said squares each having apices and said squares arranged so that at least one apex of one square is intermediate and offset from the apices of its adjacent square thereby producing a warp resistant panel due to offsetting apices of said squares which resist warp and torque.
2. The panel of claim 1, wherein:
(a) said squares on at least three adjacent sides of said random pattern being positioned so as to form in said three adjacent sides straight edges.
3. The panel of claim 1, wherein:
(a) wherein said squares on at least four adjacent sides of said random pattern being positioned so as to form in said four adjacent sides straight edges.
4. The panel of claim 1, wherein:
(a) said first square having a length of about six inches and said fourth square having a length of about three inches.
5. The panel of claim 4, wherein:
(a) said second and third squares having lengths of about five and four inches, respectively.
6. The panel of claim 1, wherein:
(a) at least one of said fourth squares is provided so as to have four other said fourth squares each arranged adjacent the four sides thereof.
7. The panel of claim 1, wherein:
(a) at least one of said first square is provided so as to have another one of said first square arranged adjacent one side thereof.
8. The panel of claim 1, wherein:
(a) at least one of said third square is provided so as to have four other said third squares each arranged adjacent the four sides thereof.
9. The panel of claim 1, wherein:
(a) at least one of said second square is provided so as to have three other said second squares each arranged adjacent the three sides thereof.
10. The panel of claim 1, wherein:
(a) said pattern including all four size squares defines a minimum area of about nine-by-twenty six inches.
11. The panel of claim 1, wherein:
(a) the bevelled edges of adjacently disposed squares defining generally V-shaped grooves.
12. The panel of claim 11, wherein:
(a) said grooves including first and second sets of grooves running generally perpendicular to each other.
13. The panel of claim 1, wherein:

(a) said second laminate is made of a plywood material and said squares are made of wood.

14. The panel of claim 1, in combination with a piece of furniture.

15. A non-warping structural panel, comprising:
(a) a first laminate and a second laminate for supporting said first laminate;
(b) said first laminate secured to said second laminate;
(c) said first laminate including a plurality of first, second, third, and fourth squares arranged in a side by side relation to one another and forming an overall pattern;
(d) said plurality of squares in said first laminate including at least one of said first square, one of said second square, one of said third square and one of said fourth square;
(e) said first square being of a dimension different from said second, third and fourth squares;
(f) said second square being of a dimension different from said first, third and fourth squares;
(h) said fourth square being of a dimension different from said first, second and third squares;
(i) said first square being the largest square;
(j) said second square being smaller than the first square;
(k) said third square being smaller than the second square;
(l) said fourth square being smaller than the third square;
(m) said fourth square being half the size of said first square;
(n) said third square being two-third the size of said first square;
(o) said second square being five-sixth the size of said first square;
(p) said first, second, third, and fourth squares when positioned in relation to each other forming in at least a portion of said overall pattern at least one random pattern there being in said overall pattern at least one of said first squares, and at least two of said second, third and fourth squares each;
(q) said random pattern having four sides;
(r) said squares on at least two adjacent sides of said random pattern being positioned so as to form in said two adjacent sides straight edges;
(s) said squares having bevelled edges; and
(t) said squares each having apices and said squares arranged so that at least one apex of one square is intermediate and offset from the apices of its adjacent square thereby producing a warp resistant panel due to offsetting apices of said squares which resist warp and torque.

16. The panel of claim 15, wherein:
(a) said squares on at least three adjacent sides of said random pattern being positioned so as to form in said three adjacent sides straight edges.

17. The panel of claim 15, wherein:
(a) said squares on at least four adjacent sides of said random pattern being positioned so as to form in said four adjacent sides straight edges.

* * * * *